(12) United States Patent
Ickert

(10) Patent No.: US 11,649,082 B2
(45) Date of Patent: May 16, 2023

(54) SEALING SUPPORTED BY PRESSURIZED AIR

(71) Applicant: MULTIVAC SEPP HAGGENMUELLER SE & CO. KG, Wolfertschwenden (DE)

(72) Inventor: Lars Ickert, Kempten (DE)

(73) Assignee: MULTIV AC SEPP HAGGENMUELLER SE & CO. KG, Wolfertschwenden (DE)

( * ) Notice: Subject to any disclaimer, the term of this patent is extended or adjusted under 35 U.S.C. 154(b) by 42 days.

(21) Appl. No.: 17/351,831

(22) Filed: Jun. 18, 2021

(65) Prior Publication Data

US 2021/0394943 A1 Dec. 23, 2021

(30) Foreign Application Priority Data

Jun. 18, 2020 (DE) .......................... 102020207551.4

(51) Int. Cl.
*B65B 51/20* (2006.01)
*B65B 51/14* (2006.01)
(Continued)

(52) U.S. Cl.
CPC .......... *B65B 51/20* (2013.01); *B29C 66/8266* (2013.01); *B65B 7/164* (2013.01); *B65B 51/14* (2013.01)

(58) Field of Classification Search
CPC ......... B65B 7/162; B65B 7/164; B65B 7/165; B65B 31/028; B65B 51/14; B65B 51/20
(Continued)

(56) References Cited

U.S. PATENT DOCUMENTS 3,536,567 A * 10/1970 Harrison ........... B29C 66/81455
426/410
3,793,115 A * 2/1974 Jindra ............... B29C 66/73921
156/499
(Continued)

FOREIGN PATENT DOCUMENTS

DE 42 14 530 A1 10/1993
DE 101 49 136 A1 4/2003
(Continued)

OTHER PUBLICATIONS

German Search Report dated Jan. 5, 2021, Application No. 10 2020 207 551.4, Applicant MULTIVAC Sepp Haggenmueller SE & Co. KG, 7 Pages.
(Continued)

*Primary Examiner* — Stephen F. Gerrity
(74) *Attorney, Agent, or Firm* — Brooks Kushman P.C.

(57) ABSTRACT

A method of closing a packaging tray comprises arranging a packaging tray between a lower tool and an upper tool of a sealing station, positioning a cover film above the packaging tray between the lower tool and the upper tool, and pressing together the cover film and the packaging tray by a lower sealing surface of the lower tool and an upper sealing surface of the upper tool cooperating with the lower sealing surface. During the pressing together, a connection is established between the cover film and the packaging tray along a sealing seam. While the cover film and the packaging tray are being pressed together, an overpressure is locally generated by supplying pressurized gas from a pressurized-gas source, the overpressure cooperating as a counterpressure with the lower sealing surface or with the upper sealing surface so as to press the cover film and the packaging tray together.

20 Claims, 4 Drawing Sheets

(51) Int. Cl.
    *B29C 65/00*     (2006.01)
    *B65B 7/16*     (2006.01)

(58) Field of Classification Search
    USPC ..................... 53/478, 329.3, 373.9, 374.8
    See application file for complete search history.

(56) References Cited

U.S. PATENT DOCUMENTS

| | | | |
|---|---|---|---|
| 3,962,844 A | | 6/1976 | Gordon |
| 4,811,550 A | * | 3/1989 | Hautemont ............. B65B 7/167 |
| | | | 53/329.3 |
| 4,991,375 A | * | 2/1991 | Raque et al. ....... B29C 66/8322 |
| | | | 198/803.14 |
| 5,010,714 A | * | 4/1991 | Medwed et al. ........ B29C 43/10 |
| | | | 29/521 |
| 5,049,720 A | | 9/1991 | Fang et al. |
| 5,156,329 A | * | 10/1992 | Farrell .................. B29C 66/612 |
| | | | 73/49.3 |
| 5,331,791 A | * | 7/1994 | Fux et al. .............. B65B 61/18 |
| | | | 53/373.7 |
| 2002/0023414 A1 | | 2/2002 | Aylward |
| 2004/0244338 A1 | | 12/2004 | Nievergeld |
| 2013/0255201 A1 | * | 10/2013 | Holzem et al. ........... B65B 7/00 |
| | | | 53/557 |

FOREIGN PATENT DOCUMENTS

| | | | | |
|---|---|---|---|---|
| EP | | 0 564 695 A1 | 10/1993 | |
| EP | | 2 284 085 A1 | 2/2011 | |
| JP | | 03200522 A | * 9/1991 | ......... B29C 66/8266 |
| NL | | 9202176 A | * 3/1994 | ............ B65B 31/028 |
| WO | WO-2007090571 A2 | * 8/2007 | ........... B65B 31/028 |

OTHER PUBLICATIONS

European Search Report (with English Machine Translation) dated Nov. 22, 2021, Application No. 21178431.9-1014—Applicant MULTIVAC Sepp Haggenmueller SE & Co. KG, 12 Pages.

* cited by examiner

SEALING SUPPORTED BY PRESSURIZED AIR

CROSS-REFERENCE TO RELATED APPLICATIONS

This application claims foreign priority benefits under 35 U.S.C. § 119(a)-(d) to German patent application number DE 10 2020 207 551.4, filed Jun. 18, 2020, which is incorporated by reference in its entirety.

TECHNICAL FIELD

The present disclosure relates to the sealing of a cover film to a packaging tray for closing the packaging tray.

BACKGROUND

Packaging machines including a sealing station for closing packaging trays, which are filled with a product to be packed, by sealing thereto a cover film are known from practice. The sealing station usually comprises a lower tool and an upper tool, which cooperate so as to join the packaging tray and the cover film along a flange area of the packaging tray by means of heat and by application of pressure. During the sealing process, the packaging tray and cover film are pressed together between a sealing surface of the lower tool and a sealing surface of the upper tool along a circumferentially extending sealing seam. Especially when foodstuffs are being packed, care must be taken to ensure that the sealing seam is actually tight, so as to be able to guarantee an adequate shelf life of the products.

Reliably achieving a tight sealing seam is a special challenge, if the packaging tray has one or more local irregularities in the area intended for the sealing seam, such as an elevation, a depression, a recess, a slit, a deviating material thickness, or a deviating type of material. In this case, it may be difficult to press the packaging tray and the cover film together with sufficient pressure during sealing along the entire length of the sealing seam.

SUMMARY

It is an object of the present disclosure to provide a way in which also packaging trays with a sealing area having locally one or more irregularities can reliably be sealed with a cover film along a tight sealing seam.

According to an aspect of the present disclosure, a method of closing a packaging tray is provided. The method comprises arranging a packaging tray, which is filled with a product to be packed, between a lower tool and an upper tool of a sealing station. A cover film is positioned above the packaging tray between the lower tool and the upper tool of the sealing station. By means of a lower sealing surface of the lower tool and an upper sealing surface of the upper tool cooperating with the lower sealing surface, the cover film and the packaging tray are pressed together. During the pressing together, a connection is established between the cover film and the packaging tray along a sealing seam. By supplying pressurized gas from a pressurized-gas source, an overpressure is locally generated while the cover film and the packaging tray are being pressed together. The overpressure cooperates as a counterpressure with the lower sealing surface or with the upper sealing surface, so as to press the cover film and the packaging tray together.

The overpressure generated by the supply of pressurized gas may locally support the sealing process. By generating the local overpressure as a counterpressure for the lower sealing surface or the upper sealing surface, the quality or the strength of the sealing can be improved locally in one or in more areas. In particular, the local overpressure may support the sealing process at one or more locations at which the sealing pressure achieved by pressing together the cover film and the packaging tray by means of the lower sealing surface and the upper sealing surface is not sufficient on its own. The overpressure generated by supplying pressurized gas may act as a non-shape-bound counterpressure element. The non-shape-bound counterpressure element provided by the overpressure may adapt perfectly to the local shape of the packaging tray and to thus provide a uniform counterpressure for sealing, independently of the local shape of the packaging tray.

The overpressure may be generated in an area in which the packaging tray has a local irregularity as regards its shape or its material. For example, the overpressure may be generated in an area in which the packaging tray has an elevation, a depression, a recess, a slit, a deviating material thickness, or a deviating type of material. The overpressure may be generated in an area in which the packaging tray has a reduced rigidity. The overpressure may be generated in an area in which conditions are difficult for applying sufficient pressure force to press the packaging tray and the cover film together by means of the lower sealing surface and the upper sealing surface.

Preferably, the overpressure is generated in an area in which the packaging tray locally exhibits a reduced density or a reduced thickness. The overpressure may ensure that a pressing force applied by the lower sealing surface or by the upper sealing surface is counteracted by a suitable counterpressure, even if, due to the locally reduced density or reduced thickness of the packaging tray in the area in question, this counterpressure cannot, or not completely, be applied by the opposite sealing surface. The overpressure may ensure that a sufficiently strong connection is established between the packaging tray and the cover film, even in an area in which the packaging tray has a reduced thickness.

If the packaging tray comprises at least two superimposed layers of material, the overpressure will preferably be generated in an area, in which at least one material layer of the packaging tray is omitted. In the area of the omitted material layer, the packaging tray may have a locally reduced thickness and/or a reduced rigidity.

For example, the packaging tray may include a first material layer and a second material layer. A rigidity of the first material layer may be higher than a rigidity of the second material layer. The first material layer may be a layer of cardboard or paper. The second material layer may be a film layer. The first material layer and the second material layer may be superimposed and connected to each other. For example, the first material layer could define the shape of the packaging tray. The second material layer could be provided inside the tray on the first material layer, so as to separate a product to be packed from the first material layer and/or to seal the packaging tray. Preferably, the second material layer is formed on the first material layer as an oxygen barrier layer between the product and the first material layer.

In the case of a rectangular or polygonal packaging tray, the first material layer could comprise slit-shaped openings, e.g., in the area of the corners of the packaging tray, so as to facilitate folding of the packaging tray. The second material layer could be provided on the first material layer inside the packaging tray and extend across the slit-shaped openings. When the cover film is being sealed to the packaging tray, a negative pressure could be generated in one or more areas in which the slit-shaped openings cross the sealing seam, the negative pressure cooperating as a counterpressure with the lower sealing surface or with the upper sealing surface, so as to press the cover film and the packaging tray together. The overpressure may reduce the occurrence of leaks caused by an inadequate transmission of pressing force in the area of the slit-shaped openings during the sealing process.

The overpressure may be generated at at least one corner of the packaging tray. According to an embodiment, the overpressure is generated exclusively at one or more corners of the packaging tray.

The local overpressure may be generated at a location lying at a point along the line of the sealing seam to be established or crossing the sealing seam to be established.

The lower sealing surface or the upper sealing surface may have provided therein a pressurized-gas aperture. The overpressure may be provided through the pressurized-gas aperture. Providing the pressurized-gas aperture in the lower sealing surface or in the upper sealing surface may make it easier to build up pressure during the sealing process directly in the area of the sealing seam to be established. If the pressurized-gas aperture is provided in the lower sealing surface, the overpressure may cooperate as counterpressure with the upper sealing surface. If the pressurized-gas aperture is provided in the upper sealing surface, the overpressure may cooperate as counterpressure with the lower sealing surface.

Preferably, the generation of the overpressure by a supply of pressurized gas only takes place after the cover film and the packaging tray have been pressed together by means of the lower sealing surface and the upper sealing surface at least for a first period of time. In particular, the cover film and the packaging tray may already have been pressed together under the action of heat before the overpressure is generated. If sealing has already been started before the overpressure is generated, the course of the sealing seam on the packaging tray and on the cover film may already have been defined before the overpressure is generated. If there is already a connection between the packaging tray and the cover film, at least in some areas, before the overpressure is generated, it may be easier to generate the overpressure precisely at the correct locations. If the local overpressure is not generated until sealing has already been started, it may be easier to generate the local overpressure because, due to the fact that sealing has already been started, an escape of the pressurized gas may be prevented, at least partially.

Preferably, the overpressure is reduced again, at least partially, before the pressing together of the cover film and the packaging tray by means of the lower sealing surface and the upper sealing surface is terminated. In this way, pressure losses during opening of the sealing station may be reduced. In addition, the packaging tray may be prevented from being unintentionally moved or displaced by the overpressure during or after opening of the sealing station.

The overpressure may be a pressure of at least 4 bar, or at least 5 bar, or at least 6 bar.

Preferably, the pressurized gas is actively heated before it is supplied. By heating the pressurized gas, the sealing seam may be prevented from being cooled down by the pressurized gas during the sealing process, whereby the quality of the sealing seam might be reduced. The pressurized gas may be heated by means of a heating unit. For heating the pressurized gas, it may be passed through heated areas of the lower tool or the upper tool before it arrives at the location where the overpressure is to be generated. However, it would also be imaginable to heat the pressurized gas outside the upper tool and the lower tool or outside the sealing station. A heating unit used for heating the lower tool or a heating unit used for heating the upper tool may be used for heating the pressurized gas as well. However, the heating unit provided for heating the pressurized gas could also be a heating unit that is independent of heating the lower tool and independent of heating the upper tool. The heating unit may, for example, be an electrical heating unit.

According to a further aspect, the present disclosure relates to a sealing station. The sealing station comprises a lower tool provided with a lower sealing surface and an upper tool provided with an upper sealing surface. The upper tool is arranged above the lower tool. The sealing station further comprises a drive unit. The drive unit is configured to move the lower tool and the upper tool towards each other, so that a packaging tray and a cover film for closing the packaging tray are pressed together between the lower sealing surface and the upper sealing surface. Further, the sealing station comprises a pressurized-gas source. The lower sealing surface or the upper sealing surface has provided therein a pressurized-gas aperture. The pressurized-gas aperture is configured to allow an escape of pressurized gas provided by the pressurized-gas source.

Due to the provision of the pressurized-gas aperture, an overpressure may be generated locally in the area of the sealing seam by supplying pressurized gas while the cover film and the packaging tray are being pressed together, the overpressure cooperating as a counterpressure with the lower sealing surface or with the upper sealing surface so as to press the cover film and the packaging tray together.

Preferably, the lower sealing surface or the upper sealing surface is provided with a depression in which the pressurized-gas aperture is arranged. By providing the depression, the pressurized gas may escape more easily.

The sealing station may further comprise a valve configured to selectively prevent or allow a flow of the pressurized gas from the pressurized-gas source to the pressurized-gas aperture. The sealing station may further comprise a control unit. The control unit may be configured to control the drive unit for pressing the packaging tray and the cover film together by means of the lower sealing surface and the upper sealing surface. The control unit may be configured to control the valve for allowing the flow of pressurized gas to the pressurized-gas aperture after the cover film and the packaging tray have been pressed together at least for a predetermined first period of time.

The control unit may control the valve for preventing the flow of pressurized gas from the pressurized-gas source to the pressurized-gas aperture, when a predetermined second period of time, which follows the first period of time, has elapsed. Preferably, the control unit controls the drive unit for opening the sealing station only after the second period of time has elapsed, the upper tool and the lower tool being moved away from each other during opening of the sealing station.

The lower sealing tool may be configured as a tray holder for receiving the packaging tray. The lower sealing surface may provide a support surface for a flange of the packaging tray.

According to a further aspect, the present disclosure relates to a use of pressurized gas for providing a counterpressure upon connecting a packaging tray to a cover film along a sealing seam by pressing the packaging tray and cover film together by means of a lower sealing surface and an upper sealing surface.

Preferably, the pressurized gas is supplied only locally, with respect to a length of the sealing seam, so as to compensate for a local irregularity in the packaging tray during the process of connecting the packaging tray and the cover film. This is to be understood in the sense that the influence of the local irregularity on the sealing process is to be compensated for. It is not necessary that the local irregularity itself is eliminated by the pressurized gas.

The disclosure relates to a method of sealing a packaging tray, a sealing station, and a use of pressurized gas. Features, characteristics and explanations described with respect to one of these aspects may each be transferred to the other aspects. In particular, the sealing station may be suitable, designed and/or configured to carry out the method or the use.

BRIEF DESCRIPTION OF THE DRAWINGS

In the following, the present disclosure will be explained in more detail on the basis of an embodiment with reference to the figures, in which.

DETAILED DESCRIPTION

Figure 1:
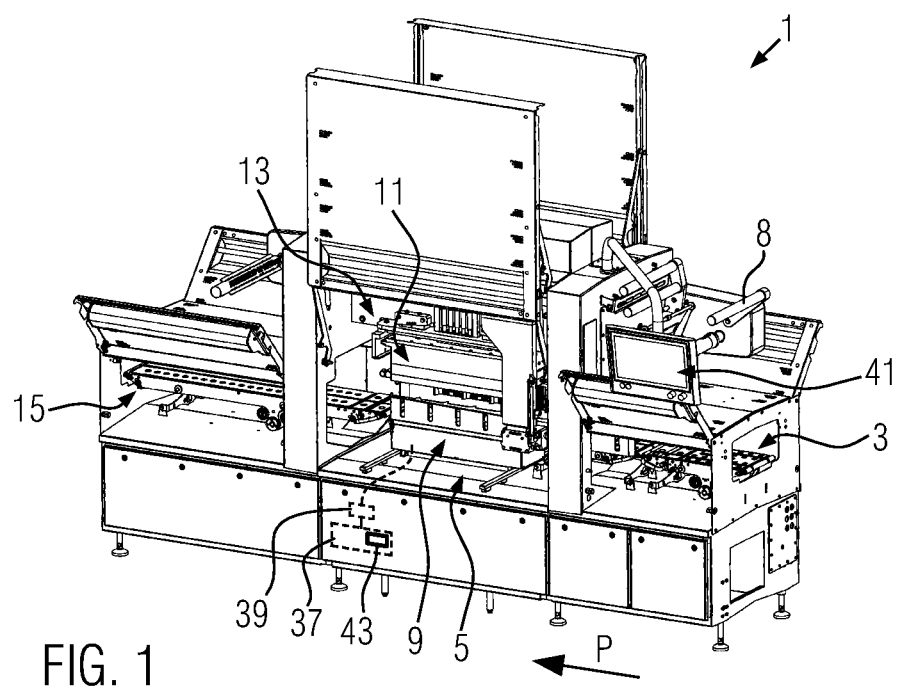
FIG. 1 shows a schematic perspective view of a packaging machine including a sealing station according to an embodiment.

FIG. 1 shows a packaging machine 1 according to an embodiment. The packaging machine 1 comprises a feed device 3 for packaging trays 4 to be closed, which are filled with a product, (cf. FIG. 2). The packaging trays 4 are transferred from the feed device 3 along a production direction P by means of a gripper system to a sealing station 5. In the sealing station 5, the packaging trays 4 are sealed with a cover film 7. The cover film 7 may be a plastic film. The cover film 7 is fed to the sealing station 5 from a supply roll (not shown), which is attachable to a film holder 8 of the packaging machine 1. The sealing station 5 comprises a lower tool 9 and an upper tool 11. The lower tool 9 and the upper tool 11 are arranged one above the other. By means of a drive unit 13, the sealing station 5 can be moved between an open position and a closed position. In the open position, the lower tool 9 and the upper tool 11 are spaced apart from each other along a vertical direction so that packaging trays 4 to be closed may be transferred to the lower tool 9 and a corresponding section of the cover film 7 for closing the packaging trays 4 may be moved to an area between the lower tool 9 and the upper tool 11, so as to extend above the packaging trays 4. From the open position, the sealing station 5 is moved to a closed position or sealing position in that the drive unit 13 moves the lower tool 9 and the upper tool 11 towards each other along the vertical direction. It should be noted that both the lower tool 9 and the upper tool 11 may be moved, or only either the lower tool 9 or the upper tool 11 may be moved.

During a sealing process, a packaging tray 4 and the cover film 7 are pressed together and connected to each other by means of the lower tool 9 and the upper tool 11. This is preferably done under the action of heat. For example, the lower tool 9 and/or the upper tool 11 may be heated to support the sealing process.

When the sealing process has been finished, the sealing station 5 is opened again and the sealed packaging trays 4 are transferred to a discharge device 15.

Figure 2:
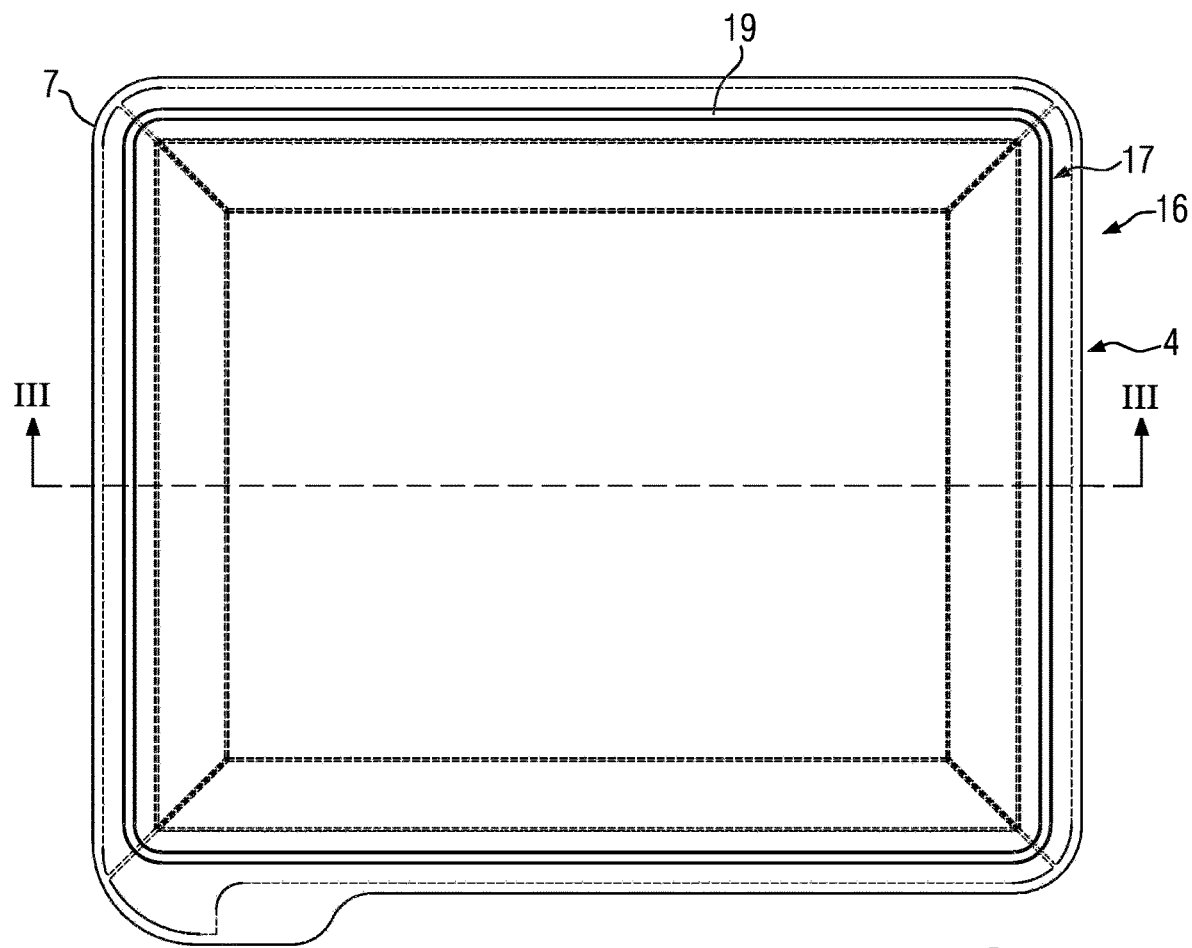
FIG. 2 shows a schematic top view of a package, which has been closed by means of the sealing station, according to the embodiment.

FIG. 2 shows a schematic top view of a finished package 16, which has been sealed in the sealing station 5. The package 16 comprises the packaging tray 4 and the cover film 7 closing the packaging tray 4. The packaging tray 4 is shown as a rectangular packaging tray. It goes without saying that also arbitrary other shapes of packaging trays 4 are imaginable. The packaging tray 4 includes a flange 17 which runs around the packaging tray 4. The flange 17 provides a connection area for connection to the cover film 7. As shown in FIG. 2, the packaging tray 4 and the cover film 7 have been connected to each other along a circumferentially extending sealing seam 19 during the sealing process. The sealing seam 19 extends fully around the packaging tray 4 along the flange 17.

Figure 3:
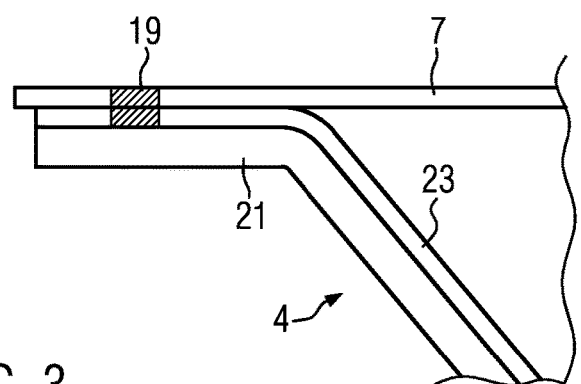
FIG. 3 shows a schematic sectional detail view of the package, the section line being depicted as in FIG. 2.

FIG. 3 shows a sectional detail view through the package 16, which is shown in FIG. 2, with respect to the section line III-III. From FIG. 3 it can be seen that the packaging tray 4 consists of two superimposed layers of material, a first material layer 21 and a second material layer 23. The first material layer 21 represents a structural layer, which determines the shape of the packaging tray 4 and provides the necessary rigidity. The first material layer 21 may, for example, be configured as a cardboard layer or a paper layer. The second material layer 23 is arranged on top of the first material layer 21 on the side facing the product. The second material layer 23 may be configured as a film layer, so as to provide an oxygen barrier between the product and the surroundings. In particular, the second material layer 23 may be a plastic film layer. In the illustrated embodiment, sealing between the cover film 7 and the packaging tray 4 takes place along the sealing seam 19 between the cover film 7 and the second material layer 23 of the packaging tray 4.

Figure 4:
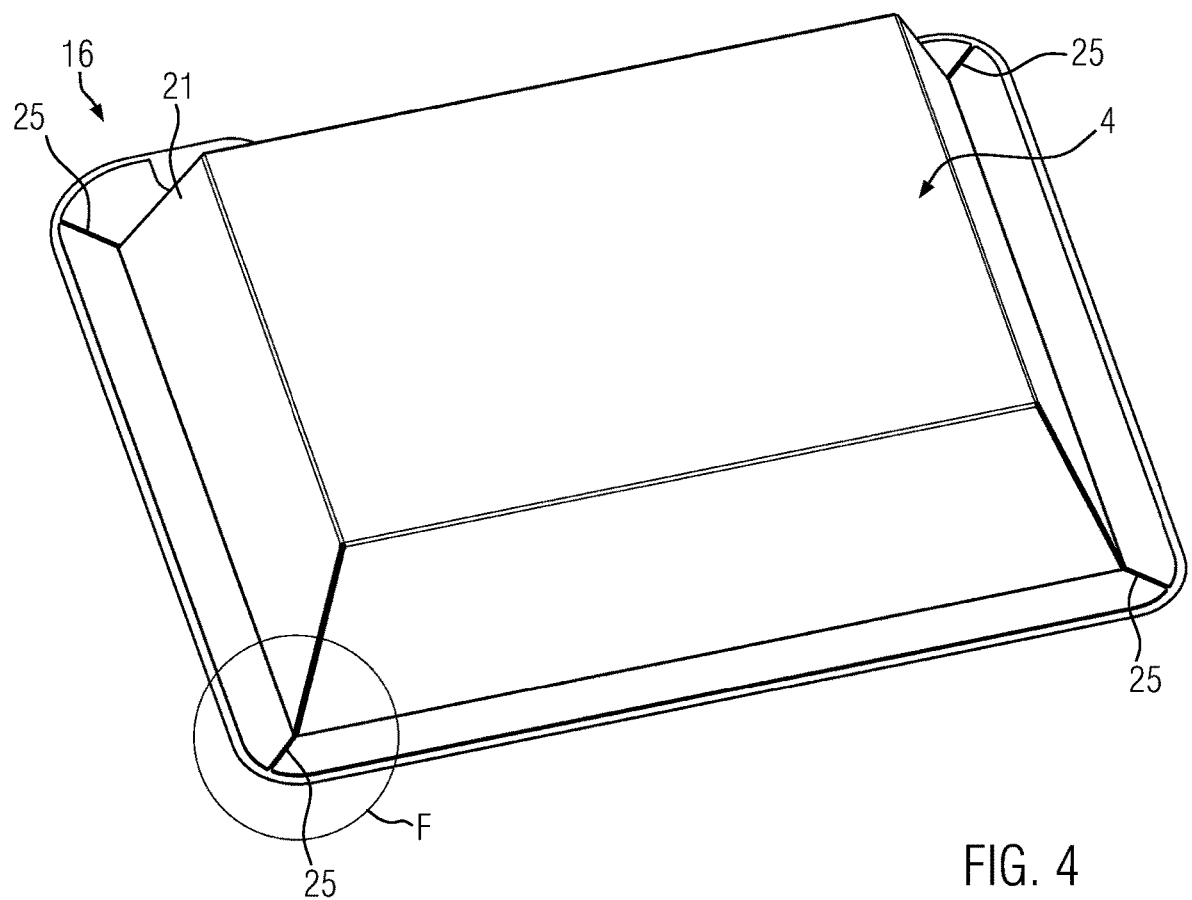
FIG. 4 shows the package according to FIG. 2 in a schematic perspective view from below.

FIG. 4 shows the package 16 in a perspective view from below. In FIG. 4, it can be seen that the first material layer 21 of the packaging tray 4 is not configured as a continuous layer. In the area of the corners of the packaging tray 4, the first material layer 21 has slits 25. The slits 25 are provided to facilitate folding of the first material layer 21 into the packaging tray 4. The slits 25 also extend across the flange 17. In particular, the slits 25 extend substantially radially outwards across the flange 17.

Figure 5:
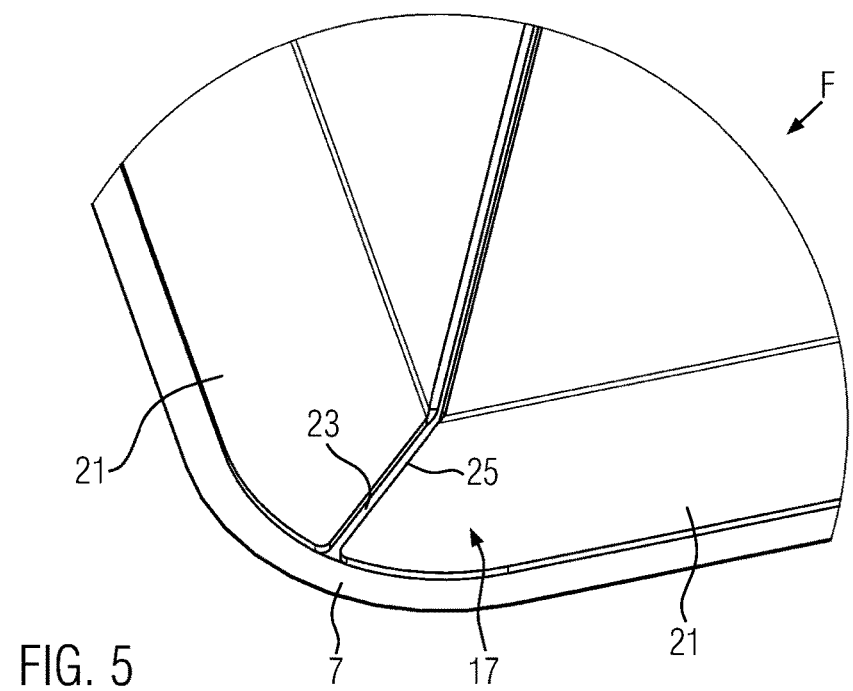
FIG. 5 shows a detail view of the area F according to FIG. 4.

FIG. 5 shows a detailed view of the area F in FIG. 4. In FIG. 5, it can be seen that the second material layer 23 extends across the slits 25. This ensures that the packaging tray 4 will be tight also in the area of the slits 25. In particular, the second material layer 23 is configured such that it is continuous across the flange 17.

Figure 6:
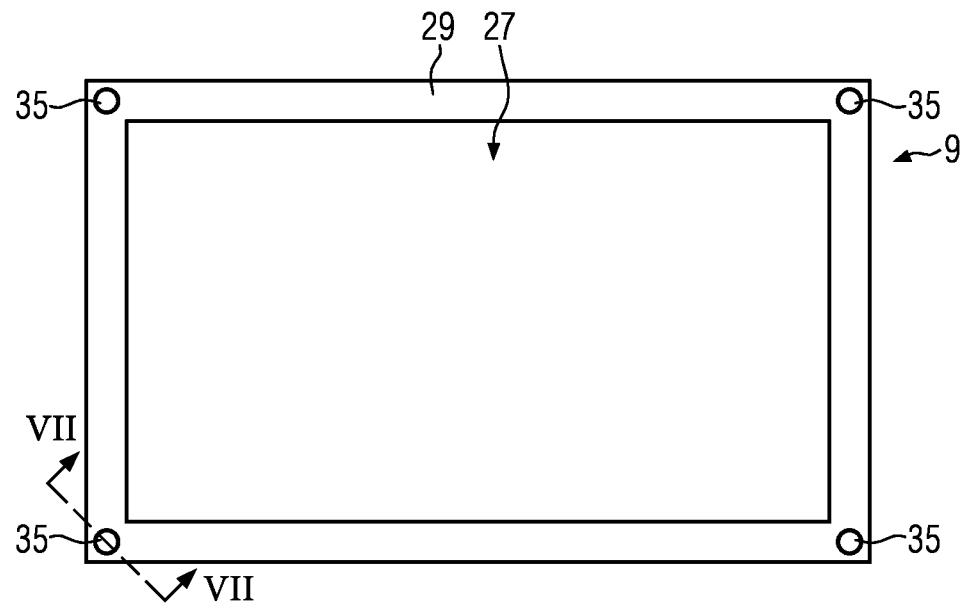
FIG. 6 shows a schematic top view of the lower tool of the sealing station according to the embodiment.

FIG. 6 shows a schematic top view of the lower tool 9 of the sealing station 5. The lower tool 9 defines a tray holder for receiving the packaging tray 4. The body of the packaging tray 4 may be received in a receiving space 27 of the lower tool 9, while the flange 17 of the packaging tray 4 rests on a lower sealing surface 29 of the lower tool 9. The lower sealing surface 29 defines a support for the flange 17 of the packaging tray 4.

Figure 7:
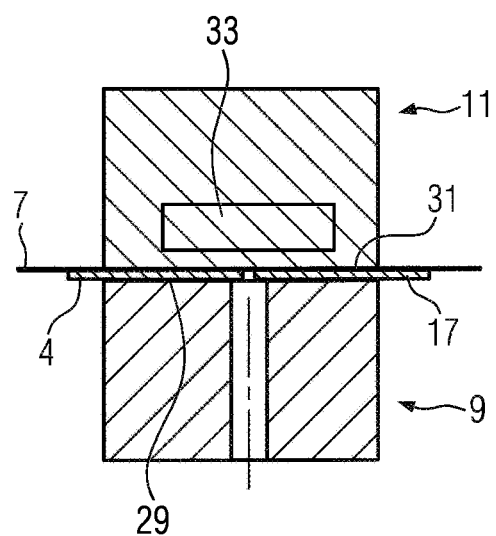
FIG. 7 shows a schematic sectional view during the sealing process, the position of the section being identified by VII-VII in FIG. 6.

FIG. 7 is a sectional view with respect to the section line VII-VII of FIG. 6 during the sealing process. FIG. 7 also shows the packaging tray 4, the cover film 7 and the upper tool 11, which have been omitted in FIG. 6 for the sake of clarity. The upper tool 11 includes an upper sealing surface 31 that faces downwards. The lower sealing surface 29 and the upper sealing surface 31 face each other. The lower sealing surface 29 and the upper sealing surface 31 may each be configured as horizontal, flat surfaces. During the sealing process, the packaging tray 4 and the cover film 7 are pressed together between the lower sealing surface 29 and the upper sealing surface 31 and are thus connected. Preferably, this is done under the action of heat, so as to facilitate the process. For example, the lower tool 9 and the upper tool 11 may be heated by means of an integrated heating device 33.

In the areas of the flange 17 where the packaging tray 4 is formed by both the first material layer 21 and the second material layer 23 superimposed thereon, i.e., everywhere except in the area of the slits 25, there is direct contact between the lower sealing surface 29 and the flange 17 and direct contact between the upper sealing surface 31 and the cover film 7 during the sealing process. When the packaging tray 4 and the cover film 7 are pressed together, the lower sealing surface 29 will act as a counterpressure element for the upper sealing surface 31 and the upper sealing surface 31 will act as a counterpressure element for the lower sealing surface 29 in these areas. In the area of the slits 25, this is not the case due to the reduced thickness of the packaging tray 4 (because of the local absence of the first material layer 21). In the area of the slits 25, the packaging tray 4 does not rest against the lower sealing surface 29. Thus, the lower sealing surface 29 cannot effectively act as a counterpressure element during sealing in the area of the slits 25. Without additional measures, this would lead to a weak point in the sealing seam 19 with a smaller connection strength in the area of the slits 25. In the area of the slits 25, leaks could occur in the connection between the packaging tray 4 and the cover film 7.

To cope with this problem, pressurized-gas apertures 35 are provided in the lower sealing surface 29 in the area of the corners, at the points where the slits 25 of the packaging tray 4 are located during the sealing process. The pressurized-gas apertures 35 communicate with a pressurized-gas source 37 shown schematically in FIG. 1 and are configured to allow an escape of pressurized gas provided by the pressurized-gas source 37. The sealing station 5 further comprises a valve 39, schematically shown in FIG. 1, which is configured to selectively prevent or allow a flow of the pressurized gas from the pressurized-gas source 37 to the pressurized-gas apertures 35. During the sealing process, the valve 39 is controlled to allow pressurized gas to escape through the pressurized-gas apertures 35 and to locally generate an overpressure in the area of the slits 25. This overpressure cooperates as a counterpressure element with the upper sealing surface 31 in the area of the slits 25 during the sealing process and ensures that the sealing seam 19 will reliably be established with sufficient connection strength and tightness also in the area of the slits 25. In the illustrated embodiment, the pressurized gas presses the second material layer 23 in the area of the slits 25 from bottom to top against the cover film 7 and ensures, together with the upper sealing surface 31, that the packaging tray 4 and the cover film 7 will be pressed together in the area of the slits 25.

In the following, the sequence of steps of a sealing process in the sealing station 5 will be described. The sealing process is preferably controlled by means of a control unit 41 (cf. FIG. 1) of the sealing station 5. The control unit 41 may be a separate control unit of the sealing station 5 or may, as regards its function, be part of an overall control unit of the packaging machine 1. It is possible, but not necessary, that the control unit 41 is functionally or physically separate from an overall control unit of the packaging machine 1. As one skilled in the art would understand, the control unit 41 may include suitable hardware and software, such as one or more processors (e.g., one or more microprocessors, microcontrollers and/or programmable digital signal processors) in communication with, or configured to communicate with, one or more storage devices or media including computer readable program instructions that are executable by the one or more processors so that the control unit 41 may perform particular algorithms represented by the functions and/or operations described herein. The control unit 41 may also, or instead, include one or more application specific integrated circuits, programmable gate arrays or programmable array logic, programmable logic devices, or digital signal processors.

When the sealing process starts, the drive unit 13 is activated by the control unit 41, so as to move the lower tool 9 and the upper tool 11 to the closed position and press them together. The packaging tray 4 and the cover film 7 are thereby pressed together along the course of the sealing seam 19 to be established between the lower sealing surface 29 and the upper sealing surface 31. This is done under the action of heat. After the packaging tray 4 and the cover film 7 have been pressed together in this way for a first period of time, the control unit 41 controls the valve 39 to release the flow of pressurized gas to the pressurized-gas apertures 35. As has been described, a local overpressure is built up in the area of the slits 25, so as to press the second material layer 23 of the packaging tray 4 against the cover film 7 from below in these areas. The local overpressure is maintained for a second period of time. After the second period of time has elapsed, the control unit 41 controls the valve 39 to again stop the flow of pressurized gas to the pressurized-gas apertures 35. After the flow of pressurized gas to the pressurized-gas apertures 35 has been stopped, the control unit 41 controls the drive device 13, to open the sealing station 5 again.

Preferably, the pressurized gas is heated by means of a pressurized-gas heating device 43 before it arrives at the pressurized-gas apertures 35 in order to prevent the sealing area to be cooled down by the pressurized gas. In the illustrated embodiment, the pressurized-gas heating device 43 is provided at the pressurized-gas source 37.

In the illustrated embodiment, a thickness of the packaging tray 4, which is locally reduced due to a local opening in the first material layer 21, is compensated for by the local supply of the pressurized gas. However, an embodiment according to the disclosure could also be used for compensating other local irregularities in the structure of the packaging tray 4 in the area of the sealing seam 19. For example, instead of an opening in a lower material layer 21 of the packaging tray 4, an opening in an upper material layer 23 of the packaging tray 4 could be compensated for. It would also be imaginable, for example, to compensate irregularities caused by local material differences (with or without thickness differences) of the packaging tray 4 in the area of the sealing seam 19 by locally providing the pressurized gas during the sealing process. For example, a locally increased compressibility of the packaging tray 4 in the area of the sealing seam 19 could be compensated for.

In the illustrated embodiment, the pressurized-gas apertures 35 are provided in the lower sealing surface 29. In this case, the local overpressure generated by the supply of pressurized gas may cooperate as a counterpressure element with the upper sealing surface 31 during the sealing process.

Depending on the respective case of use, it would also be imaginable, alternatively or additionally, to provide suitable pressurized-gas apertures 35 in the upper sealing surface 31. By supplying pressurized gas through these pressurized-gas apertures 35, an overpressure could locally be generated, which could cooperate as a counterpressure element with the lower sealing surface 29 during the sealing process.

What is claimed is:

1. A method of closing a packaging tray, the method comprising:
   arranging a packaging tray, which is filled with a product to be packed, between a lower tool and an upper tool of a sealing station;
   positioning a cover film above the packaging tray between the lower tool and the upper tool of the sealing station; and
   pressing together the cover film and the packaging tray by a lower sealing surface of the lower tool and an upper sealing surface of the upper tool cooperating with the lower sealing surface, a connection between the cover film and the packaging tray being established along a sealing seam during the pressing together;
   wherein an overpressure is locally generated by supplying pressurized gas from a pressurized-gas source while the cover film and the packaging tray are being pressed together, the overpressure cooperating as a counterpressure with the lower sealing surface or with the upper sealing surface so as to press the cover film and the packaging tray together, and wherein the overpressure is generated in an area in which the packaging tray locally has a reduced thickness.

2. The method according to claim 1, wherein the packaging tray comprises at least two superimposed material layers, wherein the overpressure is generated in an area in which at least one material layer of the packaging tray is omitted.

3. The method according to claim 1, wherein the overpressure is generated at at least one corner of the packaging tray.

4. The method according to claim 1, wherein the lower sealing surface or the upper sealing surface has provided therein a pressurized-gas aperture and the overpressure is provided via the pressurized-gas aperture.

5. The method according to claim 1, wherein generation of the overpressure by supplying the pressurized gas only takes place after the cover film and the packaging tray have been pressed together by the lower sealing surface and the upper sealing surface at least for a first period of time.

6. The method according to claim 1, wherein the overpressure is reduced before the pressing together of the cover film and the packaging tray by the lower sealing surface and the upper sealing surface is terminated.

7. The method according to claim 1, wherein the overpressure is a pressure of at least 4 bar.

8. The method according to claim 1, wherein the overpressure is a pressure of at least 5 bar.

9. The method according to claim 1, wherein the overpressure is a pressure of at least 6 bar.

10. The method according to claim 1, wherein the pressurized gas is actively heated before it is supplied.

11. A sealing station comprising:
    a lower tool provided with a lower sealing surface;
    an upper tool provided with an upper sealing surface and arranged above the lower tool;
    a drive unit configured to move the lower tool and the upper tool towards each other, or to move one of the lower and upper tools toward the other, so that a packaging tray and a cover film for closing the packaging tray may be pressed together between the lower sealing surface and the upper sealing surface when the packaging tray and the cover film are positioned between the lower tool and the upper tool;
    a pressurized-gas source;
    a valve; and
    a control unit;
    wherein the lower sealing surface or the upper sealing surface has provided therein a pressurized-gas aperture, which is configured to allow an escape of pressurized gas provided by the pressurized-gas source, the valve is configured to selectively prevent or allow a flow of the pressurized gas from the pressurized-gas source to the pressurized-gas aperture, and the control unit is configured to control the drive unit for pressing the packaging tray and the cover film together by means of the lower sealing surface and the upper sealing surface and to control the valve for allowing the flow of the pressurized gas to the pressurized-gas aperture after the cover film and the packaging tray have been pressed together at least for a predetermined first period of time.

12. The sealing station according to claim 11, wherein the lower sealing surface or the upper sealing surface comprises a depression, and wherein the pressurized-gas aperture is arranged in the depression.

13. The sealing station according to claim 11, wherein the lower tool is configured as a tray holder for receiving the packaging tray, wherein the lower sealing surface provides a support surface for a flange of the packaging tray.

14. A method of closing a packaging tray, the method comprising:
    arranging a packaging tray, which is filled with a product to be packed, between a lower tool and an upper tool of a sealing station;
    positioning a cover film above the packaging tray between the lower tool and the upper tool of the sealing station; and
    pressing together the cover film and the packaging tray by a lower sealing surface of the lower tool and an upper sealing surface of the upper tool cooperating with the lower sealing surface, a connection between the cover film and the packaging tray being established along a sealing seam during the pressing together;
    wherein an overpressure is locally generated by supplying pressurized gas from a pressurized-gas source while the cover film and the packaging tray are being pressed together, the overpressure cooperating as a counterpressure with the lower sealing surface or with the upper sealing surface so as to press the cover film and the packaging tray together, wherein the packaging tray comprises at least two superimposed material layers, and wherein the overpressure is generated in an area in which at least one material layer of the packaging tray is omitted.

15. The method according to claim 14, wherein the overpressure is generated at at least one corner of the packaging tray.

16. The method according to claim 14, wherein the lower sealing surface or the upper sealing surface has provided therein a pressurized-gas aperture and the overpressure is provided via the pressurized-gas aperture.

17. The method according to claim 16, wherein the sealing station comprises a valve configured to selectively prevent or allow a flow of the pressurized gas from the pressurized-gas source to the pressurized-gas aperture, and a control unit configured to control the pressing together the cover film and the packaging tray by the lower sealing surface and the upper sealing surface and to control the valve for allowing the flow of the pressurized gas to the pressurized-gas aperture after the cover film and the packaging tray have been pressed together at least for a predetermined first period of time.

18. The method according to claim 14, wherein generation of the overpressure by supplying the pressurized gas only takes place after the cover film and the packaging tray have been pressed together by the lower sealing surface and the upper sealing surface at least for a first period of time.

19. The method according to claim 14, wherein the overpressure is reduced before the pressing together of the cover film and the packaging tray by the lower sealing surface and the upper sealing surface is terminated.

20. The method according to claim 14, wherein the overpressure comprises a pressure of at least 4 bar.

\* \* \* \* \*